(12) United States Patent
Barnwell et al.

(10) Patent No.: US 8,399,145 B2
(45) Date of Patent: Mar. 19, 2013

(54) MEMBRANE ELECTRODE ASSEMBLY (75) Inventors: David Edward Barnwell, Highworth (GB); Thomas Robertson Ralph, Chippenham (GB); Peter Anthony Trew, Devizes (GB)

(73) Assignee: Johnson Matthey Fuel Cells Limited, London (GB)

( * ) Notice: Subject to any disclaimer, the term of this patent is extended or adjusted under 35 U.S.C. 154(b) by 435 days.

(21) Appl. No.: 12/679,823

(22) PCT Filed: Sep. 18, 2008

(86) PCT No.: PCT/GB2008/050838
§ 371 (c)(1),
(2), (4) Date: Mar. 24, 2010

(87) PCT Pub. No.: WO2009/040571
PCT Pub. Date: Apr. 2, 2009

(65) Prior Publication Data
US 2010/0209811 A1    Aug. 19, 2010

(30) Foreign Application Priority Data
Sep. 25, 2007   (GB) .................................. 0718620.8

(51) Int. Cl.
*H01M 8/10*   (2006.01)
(52) U.S. Cl. ....................... 429/483; 429/482
(58) Field of Classification Search .................. 429/483, 429/482
See application file for complete search history.

(56) References Cited

U.S. PATENT DOCUMENTS

| 5,187,025 A | 2/1993 | Kelland et al. |
| 6,756,147 B1 | 6/2004 | Bronold et al. |
| 2003/0049367 A1 | 3/2003 | Biegert et al. |
| 2009/0234057 A1 | 9/2009 | Adler et al. |

FOREIGN PATENT DOCUMENTS

| CN | 1568557 A | 1/2005 |
| CN | 1902777 A | 1/2007 |
| EP | 0 875 524 A2 | 11/1998 |
| EP | 1 624 515 A1 | 2/2006 |
| JP | 8259710 | 10/1996 |
| JP | 2004319153 | 11/2004 |
| JP | 2005085594 | 3/2005 |
| JP | 2005135639 | 5/2005 |
| JP | 2005-267904 A | 9/2005 |
| WO | WO-02/093672 A2 | 11/2002 |
| WO | WO-2005/020356 A1 | 3/2005 |
| WO | WO-2005/060039 A1 | 6/2005 |
| WO | WO-2006/015147 A2 | 2/2006 |
| WO | WO-2006/015147 A3 | 2/2006 |
| WO | WO-2006/020412 A2 | 2/2006 |
| WO | WO-2006/020412 A3 | 2/2006 |
| WO | WO-2006/028470 A1 | 3/2006 |
| WO | WO-2006/032894 A2 | 3/2006 |
| WO | WO-2006/032894 A3 | 3/2006 |
| WO | WO-2006/041677 A1 | 4/2006 |
| WO | WO-2007/033802 A1 | 3/2007 |
| WO | WO-2007/076595 A1 | 7/2007 |
| WO | WO-2007/113592 A1 | 10/2007 |

OTHER PUBLICATIONS

English Translation of Office Action issued in Chinese Patent Application No. 200880108537.2, dated Jul. 6, 2012.
English Translation of Office Action issued in Japanese Patent Application No. 2010-526371, dated Jun. 15, 2012.

*Primary Examiner* — Edward Johnson
(74) *Attorney, Agent, or Firm* — RatnerPrestia (57) ABSTRACT

A membrane electrode assembly having a peripheral edge region and a central region. The membrane electrode assembly comprises an ion-conducting membrane, first and second electrocatalyst layers disposed either side of the ion-conducting membrane, and first and second gas diffusion layers disposed either side of the first and second electrocatalyst layers respectively. The membrane electrode assembly further comprises an edge protection member, the edge protection member comprising a film layer, a bonding layer, and one or more additives selected from the group consisting of free radical decomposition catalyst, self regenerating antioxidant, hydrogen donors (H-donor) primary antioxidant, free radical scavenger secondary antioxidant, oxygen absorbers (oxygen scavenger) and elemental palladium. The edge protection member is positioned between the membrane and the first and/or second gas diffusion layer at the peripheral edge region of the membrane electrode assembly, and the edge protection member overlaps the first and/or second electrocatalyst layers.

11 Claims, 4 Drawing Sheets

Figure 1: Cross section of a gas diffusion electrode (GDE) based membrane electrode assembly according to the invention having an edge protection member comprising a film layer and two bonding layers.

Figure 2: Cross section of a gas diffusion electrode (GDE) based membrane electrode assembly according to the invention having an edge protection member comprising a film layer and one bonding layer.

Figure 3: Cross section of a catalyst coated membrane (CCM) based membrane electrode assembly according to the invention having an edge protection member comprising a film layer and two bonding layers.

Figure 4: Cross section of a catalyst coated membrane (CCM) based membrane electrode assembly according to the invention having an edge protection member comprising a film layer and one bonding layer.

MEMBRANE ELECTRODE ASSEMBLY

CROSS-REFERENCE TO RELATED APPLICATIONS

This application is the U.S. National Phase filing of PCT International Application No. PCT/GB2008/050838, filed Sep. 18, 2008, and claims priority of British Patent Application No. 0718620.8, filed Sep. 25, 2007, the disclosures of both of which are incorporated herein by reference in their entirety.

FIELD OF THE INVENTION

The present invention relates to a membrane electrode assembly suitable for use in a proton exchange membrane fuel cell.

BACKGROUND OF THE INVENTION

A fuel cell is an electrochemical cell comprising two electrodes separated by an electrolyte. A fuel, e.g. hydrogen or methanol, is supplied to the anode and an oxidant, e.g. oxygen or air, is supplied to the cathode. Electrochemical reactions occur at the electrodes, and the chemical energy of the fuel and the oxidant is converted to electrical energy and heat. Fuel cells are a clean and efficient power source, and may replace traditional power sources such as the internal combustion engine in both stationary and automotive power applications.

In a proton exchange membrane fuel cell (PEMFC), the electrolyte is a solid polymer membrane, which is electronically insulating but ionically-conducting. Proton-conducting membranes based on perfluorosulphonic acid materials are typically used, and protons, produced at the anode, are transported across the membrane to the cathode, where they combine with oxygen to create water.

The principle component of a PEMFC is known as a membrane electrode assembly (MEA) and is essentially composed of five layers. The central layer is the polymer membrane. On either side of the membrane there is an electrocatalyst layer, containing an electrocatalyst, which is tailored for the different requirements at the anode and the cathode. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

The MEA can be constructed by several methods. The electrocatalyst layer may be applied to the gas diffusion layer to form a gas diffusion electrode. Two gas diffusion electrodes can be placed either side of a membrane and laminated together to form the five-layer MEA. Alternatively, the electrocatalyst layer may be applied to both faces of the membrane to form a catalyst coated membrane. Subsequently, gas diffusion layers are applied to both faces of the catalyst coated membrane. Finally, an MEA can be formed from a membrane coated on one side with an electrocatalyst layer, a gas diffusion layer adjacent to that electrocatalyst layer, and a gas diffusion electrode on the other side of the membrane.

Typically tens or hundreds of MEAs are required to provide enough power for most applications, so multiple MEAs are assembled to make up a fuel cell stack. Field flow plates are used to separate the MEAs. The plates perform several functions: supplying the reactants to the MEAs, removing products, providing electrical connections and providing physical support.

WO 2005/020356 discloses MEAs wherein film layers are positioned around the edge region of the MEA. An adhesive layer is present on one or both surfaces of the film layer. The film layers reinforce the edge region of the MEA and prevent fibres from the gas diffusion layer from puncturing the membrane.

MEA failure, as demonstrated by sudden performance loss, often occurs in the edge region of the MEA and incorporation of film layers into the edge region can help to increase MEA lifetime before significant performance loss is seen. The present inventors have sought to provide an MEA wherein failure in the edge region is further decreased and serviceable lifetime is further increased before significant performance loss.

SUMMARY OF THE INVENTION

Accordingly the present invention provides a membrane electrode assembly having a peripheral edge region and a central region, wherein said membrane electrode assembly comprises an ion-conducting membrane, first and second electrocatalyst layers disposed either side of the ion-conducting membrane, and first and second gas diffusion layers disposed either side of the first and second electrocatalyst layers respectively, wherein the membrane electrode assembly further comprises an edge protection member, the edge protection member comprising a film layer, a bonding layer, and one or more additives selected from the group consisting of free radical decomposition catalyst, self regenerating antioxidant, hydrogen donors (H-donor) primary antioxidant, free radical scavenger secondary antioxidant, oxygen absorbers (oxygen scavenger) and elemental palladium, said edge protection member being positioned between the membrane and the first and/or second gas diffusion layer at the peripheral edge region of the membrane electrode assembly, and wherein the edge protection member overlaps the first and/or second electrocatalyst layers. In one embodiment of the invention, the one or more additives are selected from the group consisting of free radical decomposition catalyst, self-regenerating antioxidant, hydrogen donors (H-donor) primary antioxidant, free radical scavenger secondary antioxidant and elemental palladium. Preferably, the one or more additives are selected from the group consisting of free radical decomposition catalyst and self-regenerating antioxidant.

DETAILED DESCRIPTION OF THE INVENTION

In one embodiment of the invention, the membrane electrode assembly comprises two edge protection members, wherein one edge protection member is disposed on an anode side of the membrane electrode assembly and the second edge protection member is disposed on a cathode side of the membrane electrode assembly.

The peripheral edge region of the MEA is a region around the circumference of the MEA, and is characterised by having the edges of the membrane, electrocatalyst layers and the gas diffusion layers within its boundaries as shown in FIGS. 1 to 4 and described further hereinafter. It is useful to describe the dimensions of the MEA by referring to x, y and z directions. The x and y directions are within the plane of the layered MEA, and the z direction is through the thickness of the MEA. The ion-conducting membrane, electrocatalyst layers and gas diffusion layers do not necessarily have the same dimensions in the x-y plane. The ion-conducting membrane may be larger than the electrocatalyst layers and gas diffusion layers, and so may protrude beyond these layers at the edge of the MEA. Alternatively, the gas diffusion layers may be larger than the membrane, so there may be a gap between the two gas diffusion layers at the edge of the MEA. The peripheral edge region extends inwardly from the edges of the outermost layers, suitably by at least 1 mm, preferably by at least 5 mm. The central region is the remaining volume of the membrane electrode assembly that is not part of the edge region The edge protection member is suitably a non-conducting self-supporting film material and comprises a film layer, a bonding layer and at least one additive. In one embodiment, the edge protection member comprises two bonding layers, wherein the bonding layers are positioned one on each face of the film layer. One or more additives is incorporated in or applied to the edge protection member. The one or more additives may be incorporated in or applied to any of the components of the edge protection member. Suitably, the one or more additives is incorporated in or applied to a bonding layer. The edge protection member can either be positioned between the membrane and the electrocatalyst layer (in the case of a gas diffusion electrode based MEA) in the peripheral edge region of the MEA, or, can be positioned between the electrocatalyst layer and the gas diffusion layer (in the case of a catalyst coated membrane based MEA) in the peripheral edge region of the MEA. It is preferred that the edge protection member is positioned between the membrane and the electrocatalyst layer. Suitably, a bonding layer of the edge protection member is in contact with the electrocatalyst layer. Suitably the width of the electrocatalyst layer that overlaps the edge protection member is between 0.5 and 20 mm, preferably between 1 and 5 mm.

The film layer does not impregnate the gas diffusion layers. Suitably the film layer is non-adhesive. The melting temperature of the film layer must be higher than the temperatures used when manufacturing the membrane electrode assembly (e.g. lamination temperatures), and preferably the film layer shows no appreciable softening at the manufacturing temperatures. Preferably the film layer does not shrink appreciably under the manufacturing conditions. The film layer is suitably made of a material that does not leach contaminants into the fuel cell system, and that has low permeability to hydrogen, oxygen and water (suitably lower than the permeability of the polymer electrolyte membrane). Additionally, the material of the film layer is preferably resistant to puncture by fibres from the gas diffusion layer.

The film layer is preferably a polymeric material such as polyethylene terephthalate (PET), polyvinylidene fluoride (PVDF), ethylene-vinyl alcohol (EVOH), biaxially-oriented polypropylene (BOPP), polytetrafluoroethylene (PTFE), ethylene tetrafluoroethylene (ETFE), polyether sulphone (PES), polyether ether ketone (PEEK), fluorinated ethylene-propylene (FEP), polyphenylene sulphide (PPS) or polyimide (PI). The film layer could also be a metallised film, i.e. a thin layer of polymer coated with metal or a film coated with an amorphous oxide coating such as $SiO_2$ or $Al_2O_3$.

In a preferred embodiment, the film layer has an oxygen permeation rate of less than 50 $cm^3/m^2/day/bar$, preferably less than 10 $cm^3/m^2/day/bar$, and most preferably less than 1 $cm^3/m^2/day/bar$. Film layers that have this property include ethylene-vinyl alcohol (EVOH) (1-5 $cm^3/m^2/day/bar$), metallised PET (0.5-4 $cm^3/m^2/day/bar$) and amorphous silica coated PET (0.2-0.7 $cm^3/m^2/day/bar$). Decreasing the oxygen permeability of the film layer improves the oxygen barrier properties of the film layer. Reducing the amount of oxygen that travels from the peripheral edge region of the cathode to the peripheral edge region of the anode should decrease degradation of the membrane in the peripheral edge region. In one embodiment of the invention, the MEA comprises two edge protection members, each edge protection member comprising a film layer, and wherein the film layer in the edge protection member positioned between the membrane and the cathode gas diffusion layer has a lower oxygen permeation rate than the film layer in the edge protection member positioned between the membrane and the anode gas diffusion layer. The film layer in the edge protection member positioned between the membrane and the cathode diffusion layer suitably has an oxygen permeation rate of less than 10 $cm^3/m^2/day/bar$, and preferably less than 1 $cm^3/m^2/day/bar$, whereas the film layer in the edge protection member positioned between the membrane and the anode gas diffusion layer may have an oxygen permeation rate of more than 10 $cm^3/m^2/day/bar$.

The thickness of the film layer is suitably from 1 µm to 300 µm, preferably from 1 µm to 50 µm and more preferably from 5 µm to 20 µm.

The bonding layer may be an adhesive layer or a non-adhesive layer. Where two bonding layers are present, they may either be the same or different.

In one embodiment, the or one of the bonding layers is an adhesive layer. This adhesive layer can face the gas diffusion layer, and the adhesive can impregnate into the gas diffusion layer. Alternatively, the adhesive layer can face the membrane and the adhesive can bond to the membrane. If the edge protection member comprises two adhesive layers, the adhesive layers may contain the same or different adhesives. The thickness of the adhesive layer is suitably from 0.1 µm to 300 µm, preferably from 0.1 µm to 50 µm and more preferably 1 µm to 50 µm. The adhesive layer may be a hot-melt adhesive, a pressure-sensitive adhesive or a thermosetting adhesive. The adhesive may be polyolefin based such as polyethylene or polypropylene adhesive or other suitable polyolefin materials. The adhesive may be a copolymer of ethylene and methacrylic acid or a copolymer of ethylene and vinyl acetate, as described in U.S. Pat. No. 6,756,147. Preferably the adhesive layer does not shrink appreciably under manufacturing conditions. Suitably the adhesive layer is made of a material that does not leach contaminants into the fuel cell system.

In a second embodiment, the or one of the bonding layers is a non-adhesive layer. Suitably, the non-adhesive layer faces the gas diffusion layer, and the non-adhesive layer can impregnate into the gas diffusion layer. The thickness of the non-adhesive layer is suitably from 0.1 µm to 300 µm, preferably from 1 µm to 200 µm and more preferably 4 µm to 150 µm. The non-adhesive layer may be a thermoplastic based material such as a polyolefin based on polyethylene, polypropylene, or other suitable hydrocarbon based polymers or copolymers, or, a fluoropolymer such as polyvinylidene fluoride (PVDF), fluorinated ethylene-propylene (FEP), or other suitable fluorcarbon based polymers or copolymers. Preferably there is no softening of the non-adhesive layer at temperatures below 100° C. Preferably the non-adhesive layer does not shrink appreciably under manufacturing conditions. Suitably the non-adhesive layer is made of a material that does not leach contaminants into the fuel cell system.

One or more additives are incorporated into or applied to the edge protection member, suitably applied to or incorporated into the bonding layer(s). In the following embodiments, additives can be incorporated in or applied to any of the layers that comprise the edge protection member, but suitably at least in or on one of the bonding layers: either the bonding layer that is in contact with the electrocatalyst layer; the bonding layer that is in contact with the membrane; or, if two bonding layers are present, both bonding layers. If more than one additive is present in the edge protection member, the additives may provide a synergistic effect.

In one embodiment, the one or more additives is a free radical decomposition catalyst and in particular a hydrogen peroxide decomposition catalyst. Typical decomposition catalysts include amphoteric oxides (more specifically but not exclusively oxides of cerium and oxides of manganese). Examples are amphoteric oxides and include cerium dioxide such as Colloidal Ceria from Nyacol Nano Technologies Inc.

or from the Opaline range from Rhodia Electronics and Catalysts, Cerium Oxide nano powder from Meliorum Technologies, Inc. Also included are manganese oxides from Meliorum Technologies, Inc.

In a further embodiment the one or more additives is a self-regenerating antioxidant that is regenerated by cyclic process (Denisov cycle) rather than consumed during the stabilization process and thus scavenges any radical intermediates formed (see figure below for a simplified mechanism showing characteristic structure of a hindered light amine stabilizer (HALS))

Simplified Stabilization Mechanism of Hindered Amine Stabilizers (reference Ciba)

Typical self-regenerating antioxidants are hindered amine stabilizers (HAS) or hindered amine light stabilizers (HALS). Examples of hindered amine light stabilisers (HALS) from the Tinuvin range are N—O—R alkoxyamine (aminoether) light stabilizer (radical scavenger) such as Tinuvin 152 which has a reactable primary hydroxyl (circled) available from Ciba Specialty Chemicals.

Other examples of commercially available HALS and HAS include those sold under the generic tradenames Chimassorb® and Tinuvin® from Ciba or Lowinox from Great Lakes. These materials are typically of the following types: Decanedioic acid, bis (2,2,6,6-tetramethyl-1-(octyloxy)-4-piperidinyl)ester, reaction products with 1,1-dimethylethyl-hydroperoxide, hydroxyphenylbenzotriazoles and aminoethers. Typical trade names include, but are not limited to, Tinuvin 123, Tinuvin 328, Tinuvin 111 FDL, Tinuvin 292 HP, Tinuvin 5100, Tinuvin 5151, Tinuvin 5060, Tinuvin 5055, Tinuvin 5050, Tinuvin 5050, Chimassorb 944 (Ciba) and Chimassorb 2020.

In a further embodiment the one or more additives is a hydrogen donor (H-donor). A hydrogen donor (H-donor) primary antioxidant has reactive OH or NH groups and will react with peroxy radicals to form hydroperoxides and prevent abstraction of hydrogen from the polymer chain. Inhibition occurs via chain terminating reactions (i.e. transfer of a proton to the free radical species). The resulting radical is stable and does not abstract a proton from the polymer chain, preventing the peroxy radical from reacting with a polymer chain and causing chain scission. These primary antioxidants are often used in combination with secondary antioxidants, and are available in an extensive range of molecular weights, product forms, and functionalities. Typical H-donor primary antioxidants are sterically hindered phenols, or secondary aromatic amines. Examples of sterically hindered phenols are those from the Irganox® range from Ciba Specialty Chemicals and Lowinox® from Great Lakes, and are the most widely used stabilizers of this type. They are effective during both processing and long term thermal ageing.

In a further embodiment the one or more additives is a free radical scavenger secondary antioxidant capable of scavenging and trapping free radicals (peroxide and hydroperoxide radicals) immediately inhibiting the autoxidation cycle. Typical free radical scavenger antioxidants are hydroquinolines, hydroxylamine or acrylated bis-phenols. They also inhibit oxidation via chain termination. Under oxygen deficient conditions alkyl radical scavengers contribute significantly to the stabilization of the polymer. Typical free radical scavenger antioxidants are hydroquinolines, hydroxylamine or acrylated bis-phenols. Examples include carbon centered radical scavengers, such as lactones (substituted benzofuranone are excellent radical scavengers) and are available as lactone HP-136 from Ciba Speciality Chemicals. Others, including acrylated bis-phenols, are extremely effective in oxygen deficient environments.

Additionally, other secondary antioxidants that decompose hydroperoxide and prevent the formation of extremely reactive hydroxy and alkoxy radicals include trivalent phosphorus compounds (available from the Irgafos® range from Ciba) and thiosynergists (such as Irganox® PS 800 or 802 from Ciba).

In a further embodiment, the one or more additives is an oxygen absorber (or oxygen scavenger) capable of scavenging, inhibiting or reducing oxygen permeation through the edge protection member. Typically oxygen absorbers will scavenge and absorb any oxygen that might diffuse through the edge protection member and may help provide an oxygen barrier. An oxygen absorber (oxygen scavenger) will reduce the transport of oxygen across the edge protection member. Examples of suitable oxygen absorbers (oxygen scavengers) include Amosorb® 3000 (a copolyester resin from BP Amoco), Shelfplus® 2500 from Ciba Speciality Chemicals. Others include materials based on ascorbic acids and ascorbates, squalene and unsaturated fatty polyterpenes and dihydroanthracene.

In a further embodiment, the one or more additives is elemental palladium.

In a further embodiment, two or more additives are present in the edge protection member, wherein the two or more additives provide a syngergistic effect. In one embodiment, the two or more additives are selected from the group consisting of a free-radical decomposition catalyst and a self-regenerating antioxidant. In a second embodiment, the two or more additives are selected from the group consisting of a free radical decomposition catalyst, a self regenerating antioxidant, a H-donor primary antioxidant and free radical scavenger secondary antioxidant. Mixtures of these additives and others are also commercially available as synergistic antioxidants or multifunction antioxidants. Multifunction antioxidants combine the functions of primary and second antioxidants. Examples include Irganox® 1520 or 1726 from Ciba Speciality Chemicals.

Incorporation or application of the additive(s) in or to any of the component layers that comprise the edge protection member, is readily achieved by a number of techniques known to the skilled person. In these processes the additive(s) may be intimately mixed with the materials used to produce any of the component layers of the edge protection member, or, applied at, in or on discrete regions of the edge protection member. Alternatively the additive as a solution or dispersion may be applied directly to the desired layer(s) in the edge protection member by a suitable application process known to those skilled in the art.

The additives must be stable in the fuel cell environment and must not decompose at typical fuel cell operating temperatures (e.g. 70-100° C.).

The preferred amount of additive present in the edge protection member (whether incorporated in or applied to the film layer and/or bonding layer(s) will depend on the nature of the film layer or bonding layer material and on the nature of the additive. However, suitable levels are likely to be in the range of 0.001-20 wt % (based on the weight of the edge protection member), preferably in the range of 0.05 to 10 wt %, more preferably in the range of 0.05- to 1.0 wt %.

The ion-conducting membrane may be any type of ion-conducting membrane known to those skilled in the art. Suitably the membrane is proton-conducting. In state of the art membrane electrode assemblies, the membranes are often based on perfluorinated sulphonic acid materials such as Nafion® (DuPont), Flemion® (Asahi Glass) and Aciplex® (Asahi Kasei). The membrane may be a composite membrane, containing the proton-conducting material and other materials that confer properties such as mechanical strength. For example, the membrane may comprise a proton-conducting membrane and a matrix of silica fibres, as described in EP 875 524 or the membrane may comprise an expanded PTFE substrate. The membrane is suitably less than 200 μm thick, preferably less than 50 μm thick.

The electrocatalyst layers comprise an electrocatalyst which may be a finely divided metal powder (metal black), or may be a supported catalyst wherein small metal particles are dispersed on electrically conducting particulate carbon supports. The electrocatalyst metal (the primary metal) is suitably selected from
 (i) the platinum group metals (platinum, palladium, rhodium, ruthenium, iridium and osmium), or
 (ii) gold or silver.
The primary metal may be alloyed or mixed with one or more other precious metals such as ruthenium, or base metals such as molybdenum, tungsten, cobalt, chromium, nickel, iron, copper or an oxide thereof. Preferably, the primary metal is platinum. If the electrocatalyst is a supported catalyst, the loading of primary metal particles on the carbon support material is suitably in the range 10-90 wt %, preferably 15-75 wt %.

The electrocatalyst layers suitably comprise other components, such as ion-conducting polymer, which is included to improve the ionic conductivity within the layer. To incorporate the layers into the membrane electrode assembly, the layers can be formed on the gas diffusion layers, or the layers can be formed on the membrane.

The gas diffusion layers may be any suitable gas diffusion layers known to those skilled in the art. Typical gas diffusion layers include layers based on carbon paper (e.g. Toray® paper available from Toray Industries, Japan or U105 or U107 paper available from Mitsubishi Rayon, Japan), woven carbon cloths (e.g. the MK series of carbon cloths available from Mitsubishi Chemicals, Japan) or non-woven carbon fibre webs (e.g. ELAT series of non-woven substrates available from E-TEK Inc, USA; H2315 series available from Freudenberg FCCT FCCT KG, Germany; or Sigracet® series available from SGL Technologies GmbH, Germany). The carbon paper, cloth or web is typically modified with a particulate material either embedded within the substrate or coated onto the planar faces, or a combination of both. The particulate material is typically a mixture of carbon black and a polymer such as polytetrafluoroethylene (PTFE). Suitably the gas diffusion layers are between 100 and 300 μm thick. Preferably there is a layer of particulate material such as carbon black and PTFE on the faces of the gas diffusion layers that contact the electrocatalyst layers.

The MEAs of the invention may be prepared using the methods outlined in WO 2005/020356. The membrane, electrocatalyst layers, gas diffusion layers and edge protection members may be combined by a combination of coating and laminating processes. For example, electrocatalyst layers may be applied to gas diffusion layers by a printing process to form gas diffusion electrodes. An assembly of two gas diffusion electrodes and a membrane may be prepared, with edge protection members interposed between the edges of the gas diffusion electrodes and the membranes, and the components may be laminated together.

In a further aspect, the present invention provides a fuel cell comprising a membrane electrode assembly according to the invention.

For a more complete understanding of the invention, reference is made to the schematic drawings wherein.

Figure 1:
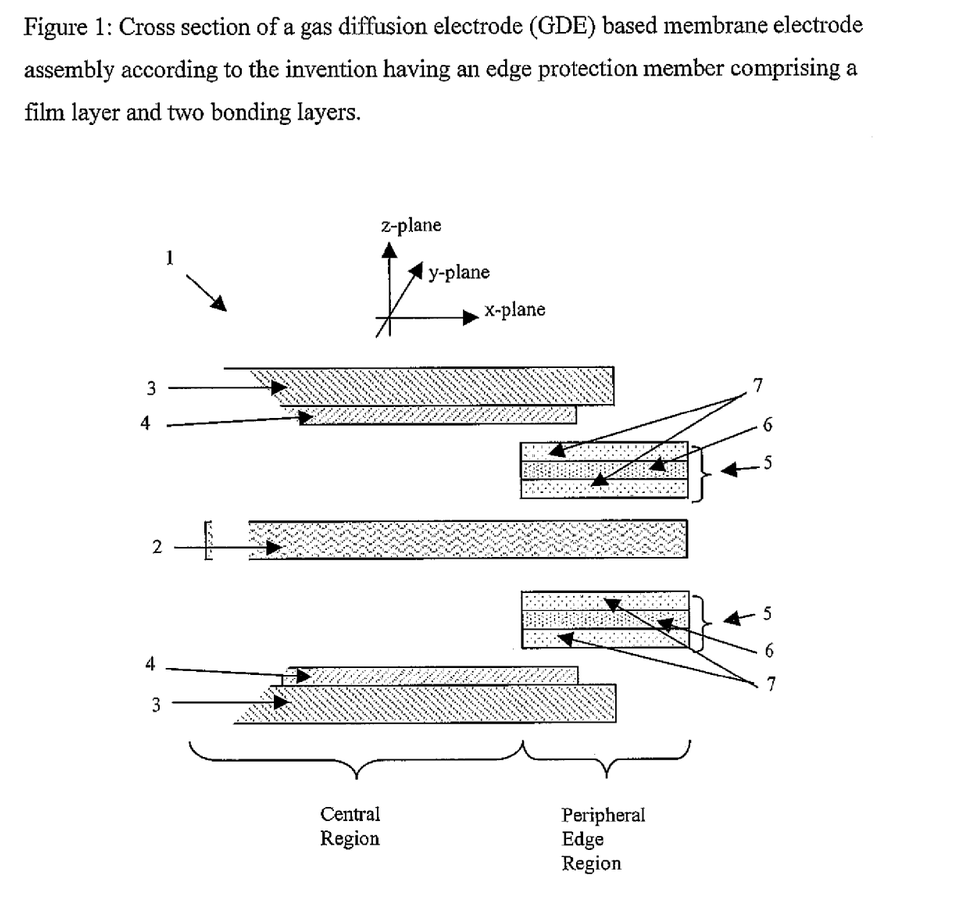
FIG. 1 is a schematic diagram showing a cross section of a gas diffusion electrode (GDE) based membrane electrode assembly according to the invention having an edge protection member comprising a film layer and two bonding layers.

FIG. 1 shows a cross section of a GDE based MEA of the invention; the z plane direction is shown, as is the central region and peripheral edge region of the GDE based MEA (1). Two gas diffusion layers (3) each have applied thereto an electrocatalyst layer (4). An edge protection member (5) is position between an ion-conducting membrane (2) and the electrocatalyst layer (4) on both sides of the membrane in the peripheral edge region of the MEA (1). Each edge protection member (5) comprises a film layer (6) and two bonding layers (7) positioned one on each face of the film layer. The bonding layers (7) are independently either an adhesive layer or a non-adhesive layer. The edge protection member comprises one or more additives either incorporated in or applied to one or more of the film layer and/or bonding layer(s).

In a process assembly step the gas diffusion layer (3) is coated with electrocatalyst layer (4) using techniques known in the art. An edge protection member (5) (comprising the film layer (6) and two bonding layer(s) (7)) are hot pressed such that one of the bonding layers (7) impregnates into the gas diffusion layer (3) and electrocatalyst layer (4). An ion conducting membrane (2) is positioned between two gas diffusion layers (3) and electrocatalyst layer (4) with edge protection member (5) impregnated therein and laminated by hot-pressing. The membrane (2) extends beyond the gas diffusion layer (3).

Figure 2:
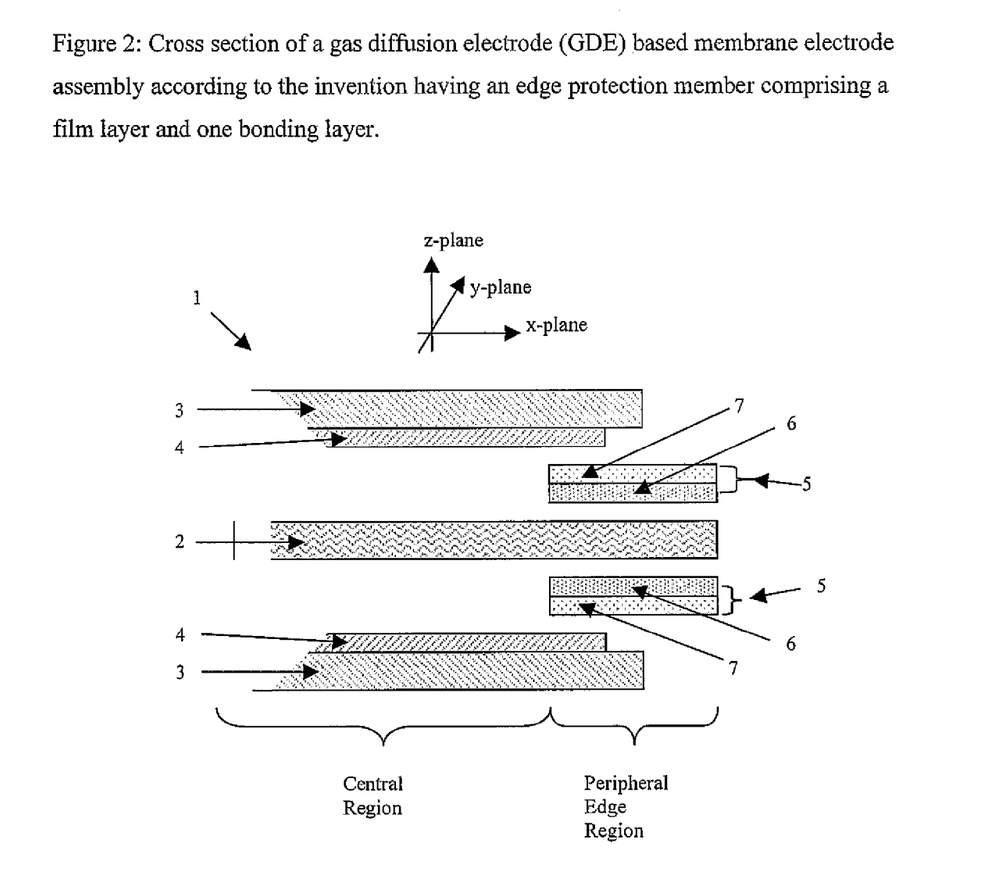
FIG. 2 is a schematic diagram showing a cross section of a GDE based membrane electrode assembly according to the invention having an edge protection member comprising a film layer and one bonding layer.

FIG. 2 shows a cross section of a GDE based MEA of the invention; the z plane direction is shown, as is the central region and peripheral edge region of the GDE based MEA (1). Two gas diffusion layers (3) each have applied thereto an electrocatalyst layer (4). An edge protection member (5) is position between an ion-conducting membrane (2) and the electrocatalyst layer (4) on both sides of the membrane in the peripheral edge region of the MEA (1). Each edge protection member (5) comprises a film layer (6) and one bonding layers (7), the bonding layer being adjacent to the electrocatalyst layer (4). The bonding layer (4) may be an adhesive layer or a non-adhesive layer. The edge protection member comprises one or more additives either incorporated in or applied to one or more of the film layer and/or the bonding layer.

The GDE based MEA shown in FIG. 2 is processed in a similar manner to that described in FIG. 1.

Figure 3:
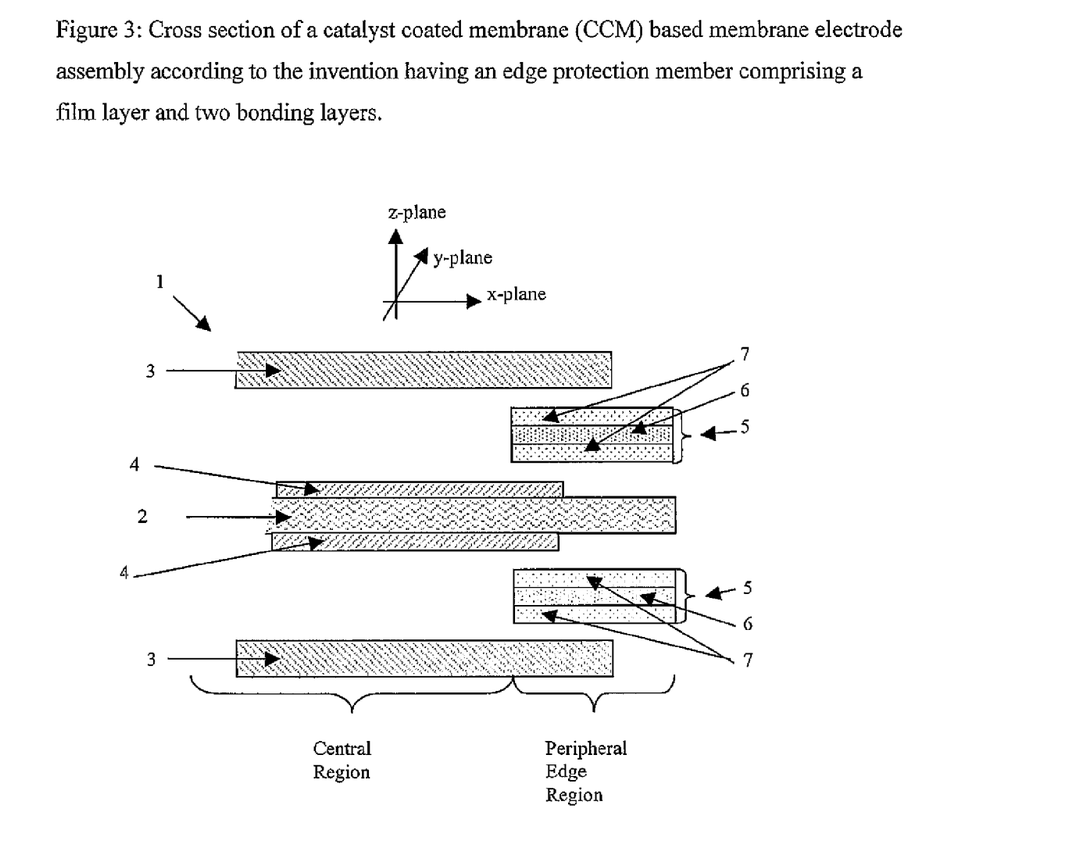
FIG. 3 is a schematic diagram showing a cross section of a catalyst coated membrane (CCM) based membrane electrode assembly according to the invention having an edge protection member comprising a film layer and two bonding layers.

FIG. 3 shows a cross section of a CCM based MEA of the invention; the z plane direction is shown, as is the central region and peripheral edge region of the CCM based MEA (1). An ion-conducting membrane (2) has electrocatalyst layers (4) coated onto both sides. An edge protection member (5) is positioned between each electrocatalyst layers (4) and a gas diffusion layer (3) on both sides of the membrane in the peripheral edge region of the MEA (1). Each edge protection member (5) comprises a film layer (6) and two bonding layers (7) positioned one on each face of the film layer. The bonding layers (7) are independently either an adhesive layer or non-adhesive layers. The edge protection member comprises one or more additives either incorporated in or applied to one or more of the film layer and/or bonding layer(s).

In a process assembly step the ion-conducting membrane (2) is coated on both sides with an electrocatalyst layer (4) using techniques known in the art. An edge protection member (5) (comprising the film layer (6) and two bonding layer(s) (7)) is positioned between the ion-conducting membrane (2) coated with electrocatalyst layer and a gas diffusion layer (3) on both sides of the membrane in the peripheral edge region of the MEA (1). The assembly is hot pressed such that the bonding layers (7) impregnate into each of the gas diffusion layers (3) and adhere or contact with the electrocatalyst layers (4) coated onto the ion-conducting membrane (2).

Figure 4:
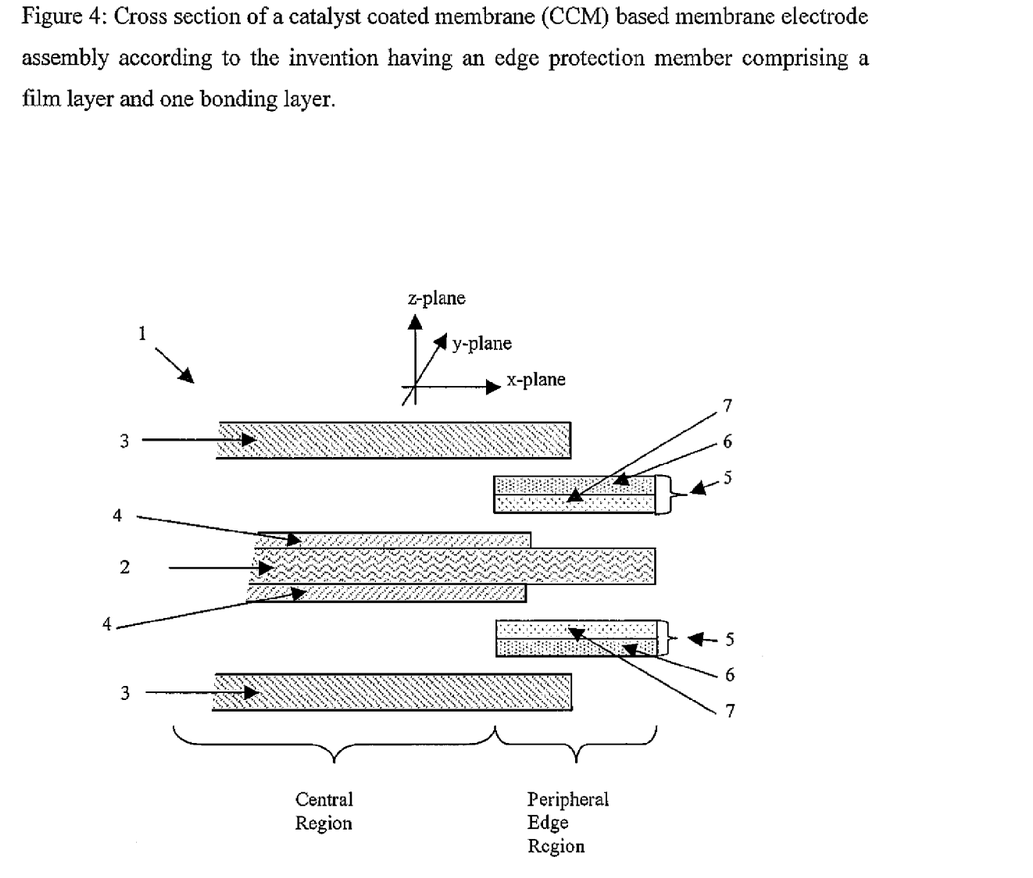
FIG. 4 is a schematic diagram showing a cross section of a catalyst coated membrane (CCM) based membrane electrode assembly according to the invention having an edge protection member comprising a film layer and one bonding layer.

FIG. 4 shows a cross section of a CCM based MEA of the invention; the z plane direction is shown, as is the central region and peripheral edge region of the GDE based MEA (1). An ion-conducting membrane (2) has electrocatalyst layers (4) coated onto both sides. An edge protection member (5) is positioned between each electrocatalyst layers (4) and a gas diffusion layer (3) on both sides of the membrane in the peripheral edge region of the MEA (1). Each edge protection member (5) comprises a film layer (6) and one bonding layers (7), the bonding layer being adjacent to the electrocatalyst layer (4). The bonding layer (4) may be an adhesive layer or a non-adhesive layer. The edge protection member comprises one or more additives either incorporated in or applied to one or more of the film layer and/or the bonding layer.

The CCM based MEA shown in FIG. 4 is processed in a similar manner to that described in FIG. 3.

The following examples help further illustrate the invention, but do not limit it.

EXAMPLE 1

Two gas diffusion layers (based on graphitised carbon fibre paper supplied by Toray) were cut to an area of 230 cm$^2$. Each gas diffusion layer was coated on one face with an electrocatalyst layer (platinum with a loading level of 0.4 mg/cm$^2$) to form anode and cathode gas diffusion electrodes.

A 30 μm thick reinforced ion-conducting membrane, based on a perfluorosulphonic acid (PFSA) polymer was cut to an area of 520 cm$^2$.

Two edge protection members were cut to form a 'picture frame' shape with a total area of approximately 290 cm$^2$. The edge protection members comprised three layers: an inner (central) polymer film layer made from an ester functional group vased polymer, arranged with a polyolefinic adhesive bonding layer on either side. The three layers were hot laminated together to form the edge protection membrane in which the layers were fused together at their interfaces. Each edge protection member was coated on one side around its periphery over a width of 3 to 5 mm from its inner edge, with colloidal ceria (cerium dioxide), supplied by Nyacol Nano Technologies. The colloidal ceria used has a solids content of 2% w/w and was applied using a Camolot© Liquid Dispenser system from Speedline Technologies at a wet coat weight of approximately 6 g/m$^2$ coated (representing ~6 μm wet thickness). The two ceria coated edge protection members were dried through a tunnel heater dryer set at 100° C. for 3 to 5 minutes (until dry).

The two electrodes, two ceria-coated edge protection members and the membrane were assembled to produce a MEA by a lamination (heat and pressure) process. The two ceria-coated edge protection members were positioned such that the ceria coating was in intimate and direct contact with the membrane surface upon lamination. After lamination, the MEA was allowed to cool to ambient temperature.

EXAMPLE 2

An MEA was produced in a similar manner to that described in Example 1. However, each edge protection member was coated on both faces around their periphery. When combining the two electrodes, two ceria-coated edge protection members and the membrane, the ceria-coated edge protection members were positioned such that the ceria coating on one face of each edge protection member was in intimate and direct contact with the membrane, and the ceria coating on the other face of each edge protection member was in intimate and direct contact with the electro catalyst layer of the electrode.

The invention claimed is:

1. A membrane electrode assembly having a peripheral edge region and a central region, wherein said membrane electrode assembly comprises an ion-conducting membrane, first and second electrocatalyst layers disposed either side of the ion-conducting membrane, and first and second gas diffusion layers disposed either side of the first and second electrocatalyst layers respectively, wherein the membrane electrode assembly further comprises an edge protection member, the edge protection member comprising a film layer, a bonding layer, and one or more additives selected from the group consisting of free radical decomposition catalysts, self regenerating antioxidants, hydrogen donor (H-donor) primary antioxidants, free radical scavenger secondary antioxidants, oxygen absorbers (oxygen scavenger) and elemental palladium, said edge protection member being positioned between the membrane and the first and/or second gas diffusion layer at the peripheral edge region of the membrane electrode assembly, and wherein the edge protection member overlaps the first and/or second electrocatalyst layers.

2. The membrane electrode assembly according to claim 1, wherein the membrane electrode assembly comprises two edge protection members, wherein one edge protection member is disposed on an anode side of the membrane electrode assembly and the second edge protection member is disposed on a cathode side of the membrane electrode assembly.

3. The membrane electrode assembly according to claim 1, wherein the edge protection member comprises two bonding layers, wherein the bonding layers are positioned one on each face of the film layer.

4. The membrane electrode assembly according to claim 1, wherein at least one of the one or more additives is incorporated in or applied to the bonding layer.

5. The membrane electrode assembly according to claim 1, wherein the edge protection member is positioned between the membrane and the electrocatalyst.

6. The membrane electrode assembly according to claim 1, wherein bonding layer is in contact with an electrocatalyst layer.

7. The membrane electrode assembly according to claim 1, wherein the bonding layer is an adhesive layer.

8. The membrane electrode assembly according to claim 1, wherein the first and second electrocatalyst layers comprise an electrocatalyst which is a finely divided metal powder or a supported catalyst wherein small metal particles are dispersed on electrically conducting particulate carbon supports.

9. The membrane electrode assembly according to claim 8, wherein the electrocatalyst is platinum optionally alloyed with another precious metal or a base metal.

10. A fuel cell comprising a membrane electrode assembly according to claim 1.

11. The membrane electrode assembly according to claim 1, wherein the bonding layer is a non-adhesive layer.

* * * * *